(12) United States Patent
Kato (10) Patent No.: US 9,473,818 B2
(45) Date of Patent: *Oct. 18, 2016

(54) TELEVISION RECEIVER, METHOD OF CONTROLLING THE RECEIVER, AND NETWORK CONSTRUCTION DEVICE

(71) Applicant: Kabushiki Kaisha Toshiba, Tokyo (JP)

(72) Inventor: Hirotsugu Kato, Konosu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 405 days.

This patent is subject to a terminal disclaimer.

(21) Appl. No.: 13/867,975

(22) Filed: Apr. 22, 2013

(65) Prior Publication Data

US 2013/0232533 A1 Sep. 5, 2013

Related U.S. Application Data

(60) Division of application No. 13/743,211, filed on Jan. 16, 2013, now Pat. No. 9,294,818, which is a continuation of application No. 12/419,929, filed on Apr. 7, 2009, now Pat. No. 8,381,256.

(30) Foreign Application Priority Data

Jun. 27, 2008 (JP) ................. 2008-169085

(51) Int. Cl.
*H04N 7/173* (2011.01)
*H04N 21/462* (2011.01)
(Continued)

(52) U.S. Cl.
CPC .... *H04N 21/4622* (2013.01); *G06F 17/30905* (2013.01); *H04N 5/44543* (2013.01);
(Continued)

(58) Field of Classification Search
CPC .................. G06F 17/30905; H04N 21/4856; H04N 5/44543; H04N 21/2358; H04N 21/42204; H04N 21/4316; H04N 21/643; H04N 21/4432; H04N 21/4782; H04N 21/4622; H04N 21/44222; H04N 21/436; H04N 21/64707; H04N 21/40
USPC .................................. 725/110, 131
See application file for complete search history.

(56) References Cited

U.S. PATENT DOCUMENTS 5,818,935 A * 10/1998 Maa ...................... H04N 7/0882
348/467
6,445,421 B1 * 9/2002 Pang ..................... G06F 9/4448
348/468

(Continued)

FOREIGN PATENT DOCUMENTS

JP 2000-330992 11/2000
JP 2002-073552 3/2002

(Continued)

OTHER PUBLICATIONS

May 9, 2008, XP55027525, retrieved from the Internet: URL:http://web.archive.org/web/20080509074500/http://www.epo.org/index_de.html [retrieved on May 18, 2012] *entire document* relevant to claims 1-10, as cited in European Search Report EP 11-18-067 dated May 18, 2012 in Munich.

(Continued)

*Primary Examiner* — Nnenna Ekpo
(74) *Attorney, Agent, or Firm* — Rutan & Tucker, LLP (57) ABSTRACT

According to one embodiment, a method of controlling an electronic device comprises accessing a world wide web (WWW) server by using information that indicates at least the menu language which is set by an initial setup module of the electronic device, through a connection module of the electronic device that connects the electronic device to the world wide web server. The method further comprises selecting content of one of languages from a set of content of various languages stored in the WWW server, where the one of languages is the same language with that of the display menu, and displaying content delivered from the WWW server.

13 Claims, 6 Drawing Sheets

(51) Int. Cl.
*G06F 17/30* (2006.01)
*H04N 5/445* (2011.01)
*H04N 21/235* (2011.01)
*H04N 21/422* (2011.01)
*H04N 21/431* (2011.01)
*H04N 21/442* (2011.01)
*H04N 21/443* (2011.01)
*H04N 21/4782* (2011.01)
*H04N 21/485* (2011.01)
*H04N 21/643* (2011.01)

(52) U.S. Cl.
CPC .... *H04N21/2358* (2013.01); *H04N 21/42204* (2013.01); *H04N 21/4316* (2013.01); *H04N 21/4432* (2013.01); *H04N 21/44222* (2013.01); *H04N 21/4782* (2013.01); *H04N 21/4856* (2013.01); *H04N 21/643* (2013.01)

(56) References Cited

U.S. PATENT DOCUMENTS

| | | | |
|---|---|---|---|
| 6,879,349 | B2 | 4/2005 | Nishida et al. |
| 7,051,360 | B1 | 5/2006 | Ellis et al. |
| 7,571,217 | B1* | 8/2009 | Saxena ............. G06F 17/30902 709/213 |
| 8,181,157 | B2* | 5/2012 | Ericsson .................. G06F 8/73 717/123 |
| 8,381,256 | B2 | 2/2013 | Kato |
| 8,881,016 | B2* | 11/2014 | Barnes ............... G06Q 30/0262 715/736 |
| 9,294,818 | B2 | 3/2016 | Kato |
| 2001/0037510 | A1 | 11/2001 | Lee |
| 2002/0002039 | A1* | 1/2002 | Qureshey .......... G06F 17/30749 455/344 |
| 2002/0144289 | A1* | 10/2002 | Taguchi et al. ............... 725/112 |
| 2002/0161743 | A1 | 10/2002 | Brebner et al. |
| 2002/0186328 | A1* | 12/2002 | Nishida et al. ............... 348/738 |
| 2003/0235397 | A1 | 12/2003 | Chu |
| 2005/0285980 | A1 | 12/2005 | Katayama |
| 2009/0328121 | A1 | 12/2009 | Kato |
| 2013/0133001 | A1 | 5/2013 | Kato |
| 2013/0239162 | A1 | 9/2013 | Kato |

FOREIGN PATENT DOCUMENTS

| | | |
|---|---|---|
| JP | 2002-278866 | 9/2002 |
| JP | 2003-134257 | 5/2003 |
| JP | 2003-274307 | 9/2003 |
| JP | 2004-227199 | 8/2004 |
| JP | 2007-281922 | 10/2007 |
| WO | WO 0004707 | 1/2000 |
| WO | WO 2005043329 | 5/2005 |

OTHER PUBLICATIONS

European Patent Application 11187067.1-2202 extended European Search Report mailed May 25, 2012.
U.S. Appl. No. 13/743,211, Office Action, mailed Feb. 23, 2015.
Japanese Patent Application No. 2008-169085, Notice of Reasons for Rejection, mailed Jun. 16, 2009, (with English translation).
Hauppauge Computer Works:WinTV-PVR-350, Internet Citation, Oct. 29, 2006, Retrieved from the Internet:URL:http://web.archive.org/web/20061029004915/www.hauppauge.com/pages/products/data_pvr350.html Retrieved on Feb. 10, 2009.
IEBlog:Accept-Language Header for Internet Explorer 7, Internet Citation, Oct. 28, 2006, pp. 1-8, XP007909994, Retrieved from the Internet:URL:http://blogs.msdn.com/ie/archive/2006/10/17/accept-languageheaderfor-internet-explorer-7.aspx, retrieved Oct. 1, 2009.
European Patent Application 09004831.5-2202, partial search report mailed Oct. 12, 2009.
U.S. Appl. No. 12/419,929, Non-Final Office Action, mailed Apr. 1, 2011.
U.S. Appl. No. 12/419,929, Final Office Action, mailed Sep. 30, 2011.
U.S. Appl. No. 12/419,929, Non-Final Office Action, mailed Apr. 2, 2012.
U.S. Appl. No. 13/743,211, filed Jan. 16, 2013 Final Office Action dated Jun. 12, 2015.
U.S. Appl. No. 13/867,970, filed Apr. 22, 2013 Non-Final Office Action dated Jul. 29, 2015.
U.S. Appl. No. 12/419,929, filed Apr. 7, 2009 Notice of Allowance dated Oct. 16, 2012.
U.S. Appl. No. 13/743,211, filed Jan. 16, 2013 Notice of Allowance dated Nov. 16, 2015.
U.S. Appl. No. 12/419,929, filed Apr. 7, 2009 Final Office Action dated Sep. 30, 2011.
U.S. Appl. No. 12/419,929, filed Apr. 7, 2009 Non-Final Office Action dated Apr. 1, 2011.
U.S. Appl. No. 12/419,929, filed Apr. 7, 2009 Non-Final Office Action dated Apr. 2, 2012.
U.S. Appl. No. 13/867,970, filed Apr. 22, 2013 Final Office Action dated Jan. 25, 2016.

* cited by examiner

TELEVISION RECEIVER, METHOD OF CONTROLLING THE RECEIVER, AND NETWORK CONSTRUCTION DEVICE

CROSS-REFERENCE TO RELATED APPLICATIONS

This application is a divisional of U.S. application Ser. No. 13/743,211 filed on Jan. 16, 2013, which is a continuation of U.S. application Ser. No. 12/419,929, now U.S. Pat. No. 8,381,256, which is based upon and claims the benefit of priority from Japanese Patent Application No. 2008-169085,filed Jun. 27, 2008, the entire contents of which are incorporated herein by reference.

BACKGROUND

1. Field

One embodiment of the invention relates to a television receiver, a method of controlling the receiver and a network construction device, especially to an improved web server connection function and connecting method.

2. Description of the Related Art

Recent personal computers can readily establish connection to a World Wide Web (WWW) server by way of the Internet. Most personal computers are provided with a browser function so that various types of information can be downloaded from the server and viewed. A WWW server doesn't offer information to a specific country but across the world. For this reason, language content that is attached to moving image content (or still image content) is prepared in different languages. Thus, when access is made from a personal computer to a WWW server to request content, a language request signal (display language request signal) is transmitted. Then, the WWW server analyzes the language request signal to determine the language requested by the user and delivers content in this language.

Recently, most digital television receivers are also provided with an Internet connection function. In a similar manner to the above computer, a digital television receiver of this type needs to transmit a language request signal when requesting content from a WWW server. The receiver, however, has an initial setup function that is to be performed at the time of purchase. The initial setup includes menu language and country settings (see Jpn. Pat. Appln. KOKAI Publication No. 2004-227199, for example). This means that, for the conventional digital television receiver, a language request signal needs to be transmitted to determine a language when accessing the WWW server by way of the Internet, separately from the settings of language and country, which makes the operation irksome.

For the above reason, digital television receivers cause inconvenience to the users. If the content is delivered in a language different from the set-up language when accessing the WWW server, some users may mistake this for a malfunction of the receiver because the initial setup is already completed.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter, with reference to the accompanying drawings. An object of the embodiments of the present invention is to offer a television receiver which can automatically maintain consistency between a language that is initially configured and a language of content that is delivered when connected to the web server, a method of controlling such a receiver and a network construction device.

According to one aspect of the present invention, there is provided an apparatus comprising: an initial setup module configured to maintain initial setup information that indicates at least a menu language; a setup information association process module configured to determine a language request signal to request a language the same as the menu language indicated in the initial setup information; and a network control module configured to access a server of the World Wide Web and transmitting the language request signal at the same time to determine a browser language.

Figure 1:
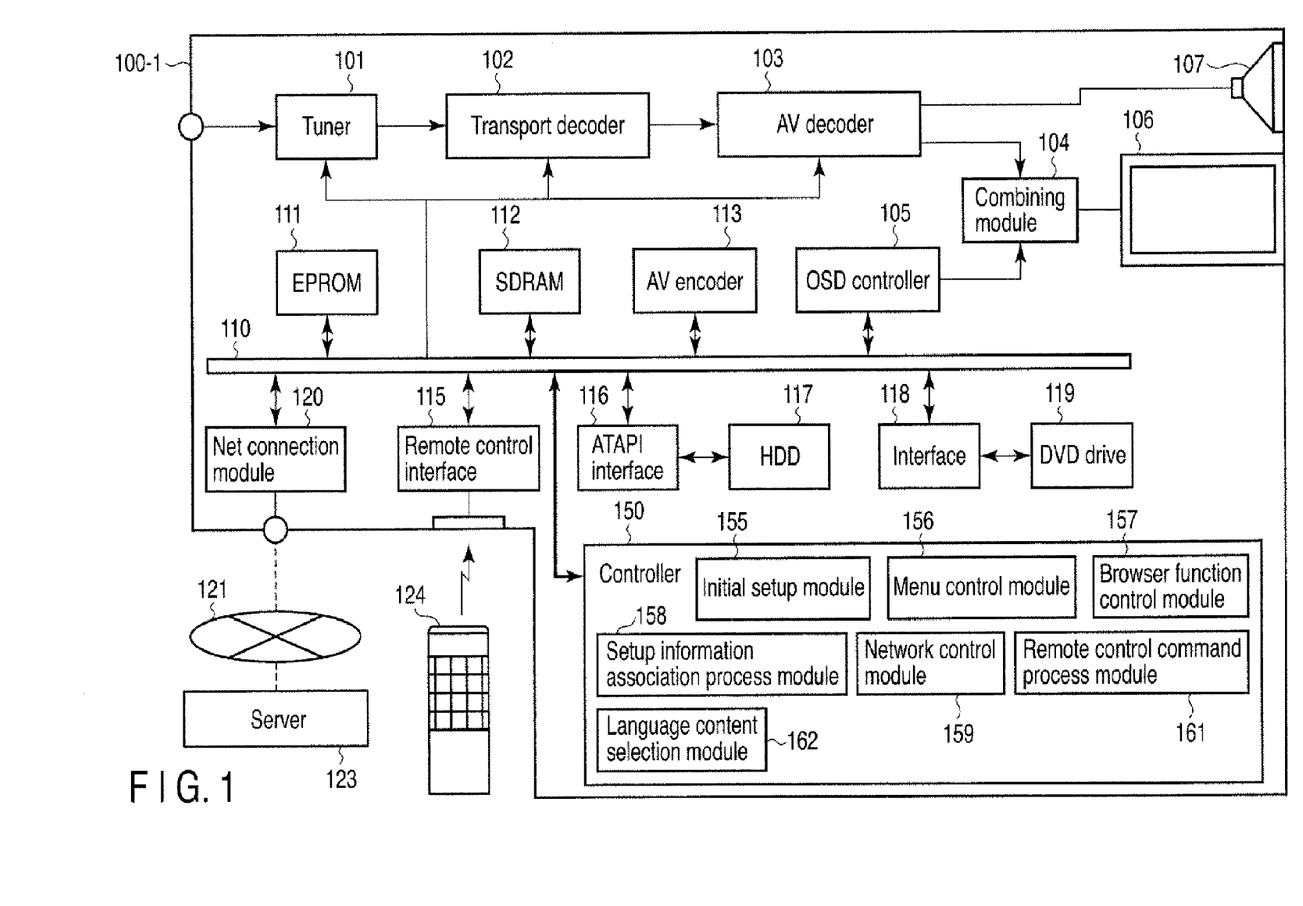
FIG. 1 is a diagram for showing an example structure of a television receiver according to the present invention.

FIG. 1 shows an example structure of a television receiver according to the invention.

A tuner 101 receives, for example, a digital broadcast signal, decodes the received signal, and supplies the decoded signal to a transport decoder 102. Video and audio data in packets of a television program selected by the transport decoder 102 is input to an audio-video (AV) decoder 103 and decoded by the decoder 103.

The audio data decoded by the AV decoder 103 is output to a speaker 107, while the video data is output to a display 106. This video data may be combined with video data supplied by an on-screen display (OSD) controller 105 at a combining module 104.

An EEPROM 111 is incorporated to store, for example, programs for implementing the functions of the television receiver and parameters for the programs. A SDRAM 112 is incorporated to temporarily store data in a process of correcting errors in received signals.

A main bus 110 is connected to the transport decoder 102, the AV decoder 103, the OSD controller 105, the EEPROM 111, the SDRAM 112 and the like.

The main bus 110 is connected to a controller 150 that controls the entire receiver. Furthermore, the receiver may be connected to an external device by way of the main bus 110. For this arrangement, the main bus 110 is connected to a net connection module 120, a remote control interface 115 and an ATAPI interface 116. A hard disk drive (HDD) 117 may be connected by way of the interface 116, and a DVD drive 119 may be connected by way of an interface 118.

AV streams divided by the transport stream decoder 102 may be stored in the HDD 117 by way of the ATAPI interface 116. At the time of reproduction, the AV streams read from the HDD 117 are decoded by the AV decoder 103.

The AV decoder 103 reproduces audio and video signals from a transport stream. The decoder 103 also reproduces audio and video signals from DVD-standard audio and video streams. The decoder 103 may be configured to further reproduce audio and video signals from signals of other standards.

An AV encoder 113 is connected to the main bus 110 to convert picture data to a specific format (for example, DVD-standard, transport stream, and baseband) so that the data can be stored in a recording medium. The converted AV information is recorded on a DVD or the like. In other words, the DVD-standard information is recorded on an optical disk by way of the DVD drive 119. The controller 150 controls all the above described blocks (or modules) in a centralized manner. The term "block" or "module" is generally defined as hardware and/or software.

The controller 150 is provided with an initial setup module 155 to make the initial setup of the television receiver. The initial setup includes "country setting" to determine the country in which the receiver is used and "language setting" to determine the menu language.

The controller 150 is also provided with a menu control module 156 to display a menu. The menu control module 156 selects a menu signal for the setup language, and outputs the menu signal by way of the OSD controller 105.

The controller 150 further includes a browser function control module 157. The browser function control module 157 displays the content delivered from the web server on the display 106.

The controller 150 still further includes a setup information association process module 158. The setup information association process module 158 is the main feature of the receiver, associating the initial setup information with the browser function control module 157. This operation will be explained later in detail.

The controller 150 also includes a network control module 159. The network control module 159 accesses a web server 123 connected to the Internet 121, by way of the net connection module 120 in accordance with an address input or address selected by the user. When making the WWW access, the network control module 159 transmits a language request signal, which will be described later.

The controller 150 also includes a remote control command process module 161. The remote control command process module 161 processes a command that is input from the remote controller 124 by way of the remote control interface 115 so that the command is reflected to the operation of a corresponding function of the receiver.

The controller 150 may be further provided with a language content selection module 162. When content of several different languages is supplied from the server, the language content selection module 162 selects, for display, the language content of the language that corresponds to the language request signal.

Figure 2:
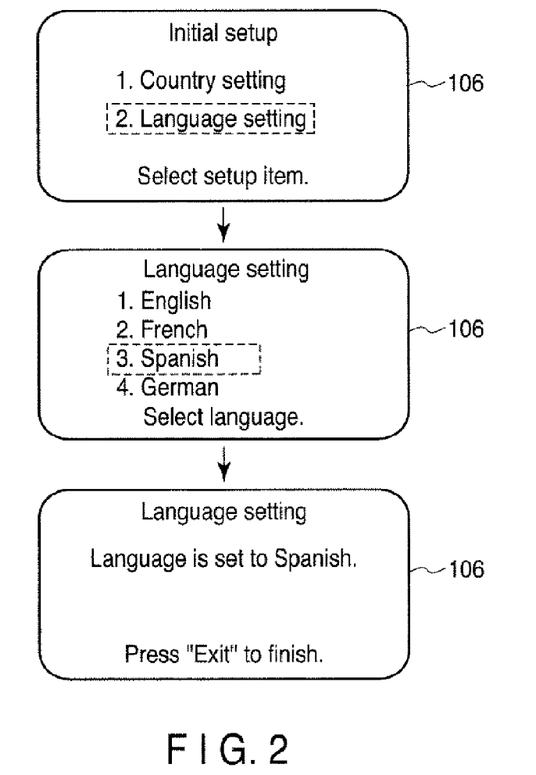
FIG. 2 is a diagram for explaining the screens of the television receiver according to the present invention when it is actually put into use.

FIG. 2 shows the screens of the display 106 of a television receiver 100-1. These screens are presented when the user performs an initial setup after purchasing the receiver. After the receiver is switched on, the user manipulates the menu button of the remote controller 124 and selects an item for the initial setup. As a result, Screen A of FIG. 2 appears. The Screen A shows "1. Country setting" and "2. Language Setting". The user manipulates the cursor key of the remote controller 124 to move the cursor. For example, "1. Country setting" is selected and the enter button is pressed. Then, a list of country names is displayed, although this is not shown in the drawing. The user places the cursor at a target country name and presses the enter button. The country setting is now completed. The display returns to the Screen A, on which the cursor is placed at "2.Language setting". When the user presses the enter button, items including "1.English", "2.French", "3. Spanish", "4.German" appear, together with a message "select language", as indicated on Screen B.

When the user places the cursor at "3. Spanish" and presses the enter button, Screen C appears with a message "Language is set to Spanish". When the "Exit" button is pressed, the language setup is completed, and the screen returns to the main menu.

After the language is configured in the television receiver of the present invention, the setup information association process module 158 automatically sets up a language request signal that is employed by the network control module 159.

More specifically, the setup information association process module 158 determines a language request signal for requesting the same language as the one designated in the initial setup information. Then, the network control module 159 accesses the WWW server by way of the net connection module 120 and transmits the language request signal at the same time in order to determine the language of the browser. The language request signal is transmitted in the head packet when accessing the server 123. In other words, the Accept-Language header of the HTTP request is changed to the description that agrees with the country and language settings.

With the above arrangement of the television receiver, the language request signal required for the Internet access is automatically determined if the menu language is selected at the initial setup. This improves the user's operability, and eliminates the possibility of being mistaken for a malfunction of the receiver.

Figure 3:
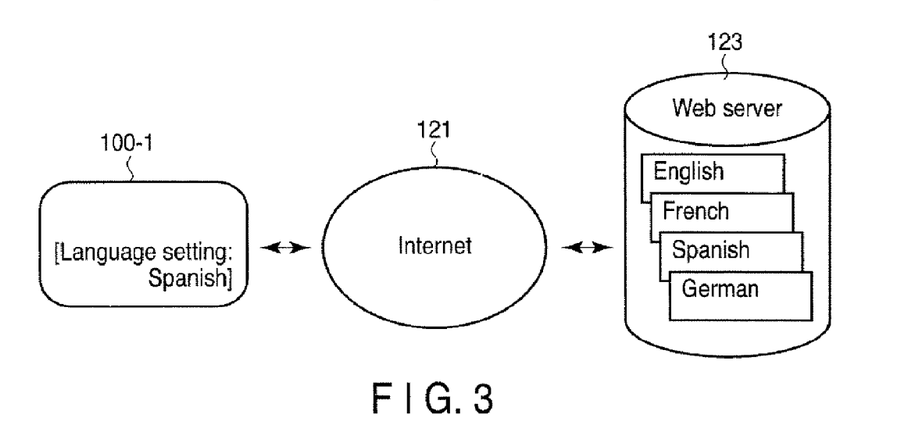
FIG. 3 is a diagram for explaining the state of the television receiver that is connected to a server by way of the Internet.

FIG. 3 illustrates the relationship of the television receiver 100-1, the Internet 121 and the server 123. Language content is prepared, for example, in English, French, Spanish and German in the server 123.

Figure 4:
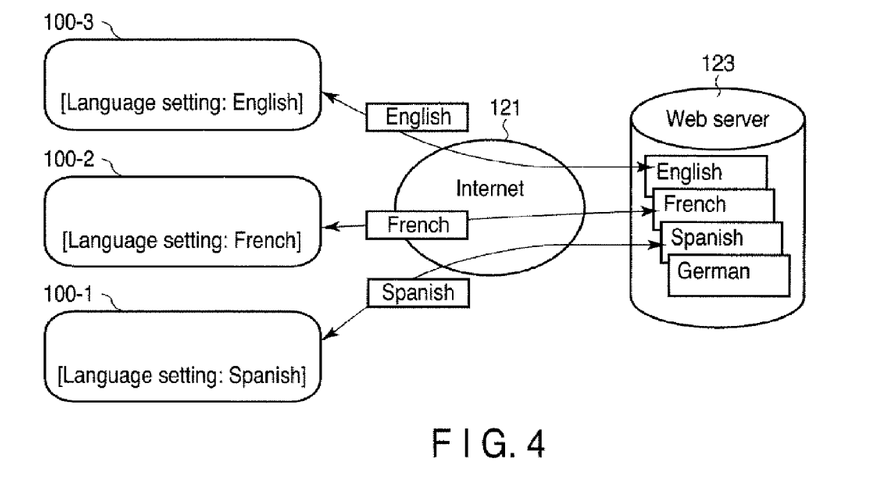
FIG. 4 is a diagram for explaining the state of the television receiver of FIG. 1 and other television receivers when connected to the server by way of the Internet.

FIG. 4 shows television receivers 100-2 and 100-3, in addition to 100-1, which are connected to the server 123 by way of the Internet 121. In this drawing, because the television receiver 100-1 is set to Spanish, Spanish language content is delivered from the server 123 to this receiver. If the television receivers 100-2 and 100-3 are set to French and English, respectively, the server 123 delivers the language content of French and English individually to the television receivers 100-2 and 100-3.

The invention is not limited to the above embodiment. If the server 123 adopts a method of classifying content by country, the content may be delivered in accordance with the information of "country setting".

Figure 5:
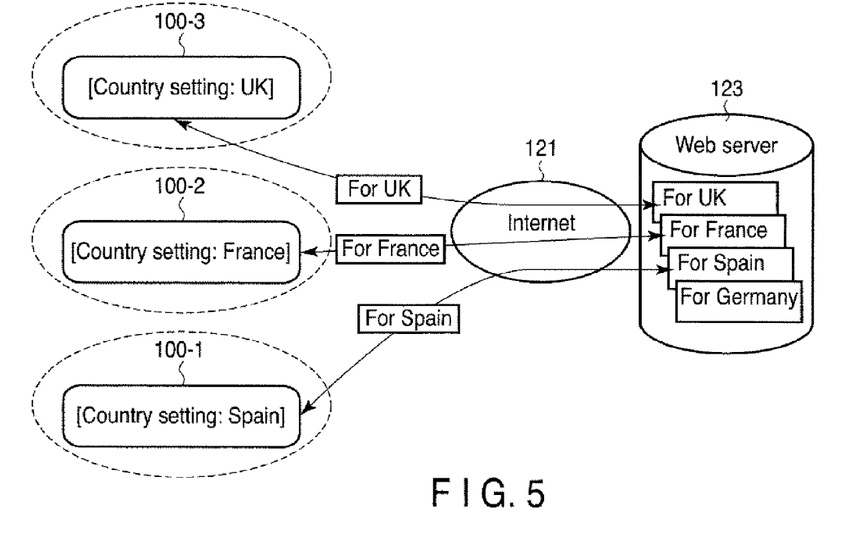
FIG. 5 is a diagram for explaining another example of the operation of the present invention.

FIG. 5 shows the server 123 distributing content that corresponds to the country setup information configured in each of the television receivers 100-1, 100-2 and 100-3. In other words, the initial setup module 155 stores at least country setup information that is configured as initial setup information. The setup information association process module 158 establishes association with the country setup information, and the network control module 159 accesses the WWW server while transmitting the country setup information.

If the server 123 offers a simultaneous distribution service of multi-lingual content, the receiver may be designed to automatically select language content corresponding to the setup language from the content of various languages.

Figure 6:
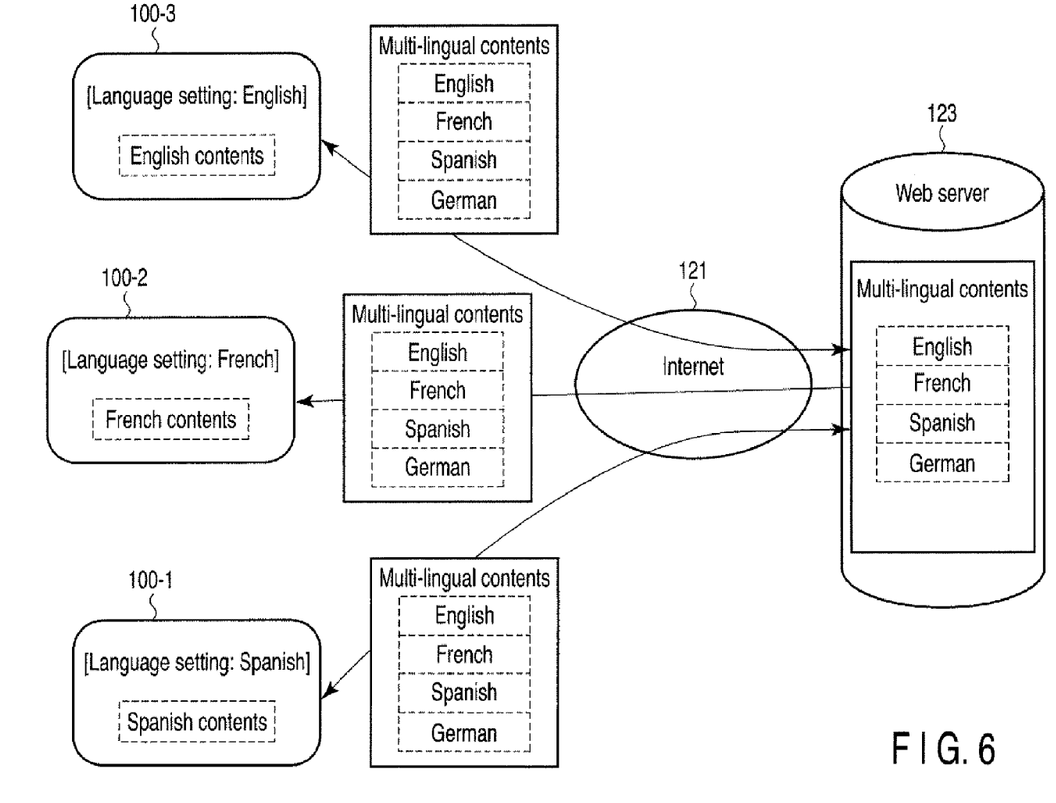
FIG. 6 is a diagram for explaining a further example of the operation of the present invention.

FIG. 6 shows the server 123 simultaneously distributing multi-lingual content. Each of the receivers can determine and receive the language content selected by the language content selection module 162. When different language content is sent from the server, the language content selection module 162 selects the language content of the language that correspond to the language request signal and adopts the language content for display.

In the above description, the operation of selecting language content is discussed. It should be noted that compressed audio data may be supplied from the server. In such a case, a speech language that corresponds to the selected display language is selected.

Figure 7:
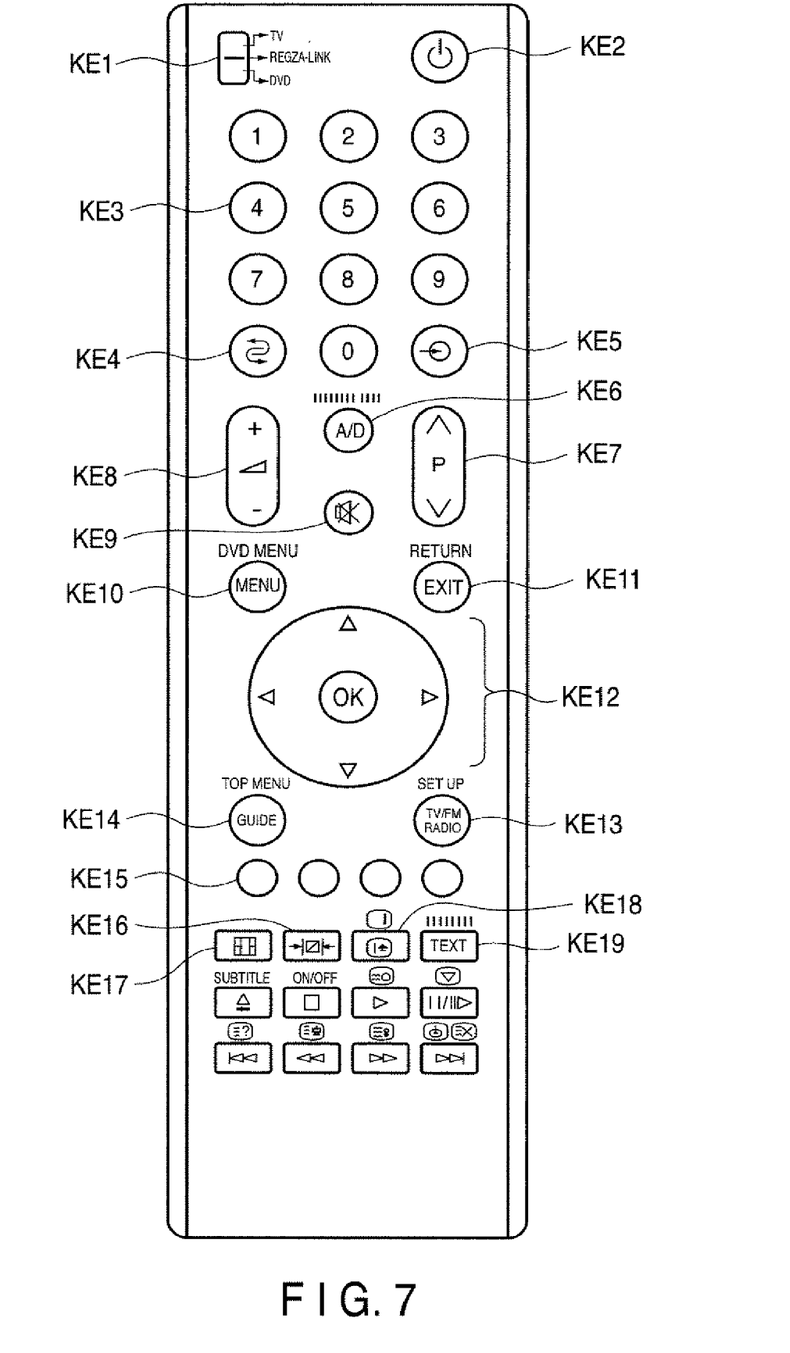
FIG. 7 is a diagram for showing a remote controller that is used for the receiver of the present invention.

FIG. 7 is an example external view of a remote controller. KE1 is a switch for selecting TV, DVD and link mode. KE2 is a power switch, and KE3 are numeric input buttons. KE4 is a button for returning to a previous program, KE5 is a button for selecting an external device input, and KE6 is an analog/digital television switch. KE7 is a button for changing a position of a program or a position on a text page, KE8 is a TV volume change button, and KE9 is a mute setup button. Further, KE10 is an on-screen menu display button, and KE11 is an operation button for exiting the menu. The triangles of KE12 indicate the cursor moving directions, and "OK" is an enter button. KE13 is a button for displaying favorite programs in digital mode, KE14 is a button for displaying a program guide, and KE15 is a text control button. In addition, KE16 is a button for selecting a picture standard from selectable TV standards, KE17 is a button for setting a wide screen, and KE19 is a button for calling up a text service.

Figure 8:
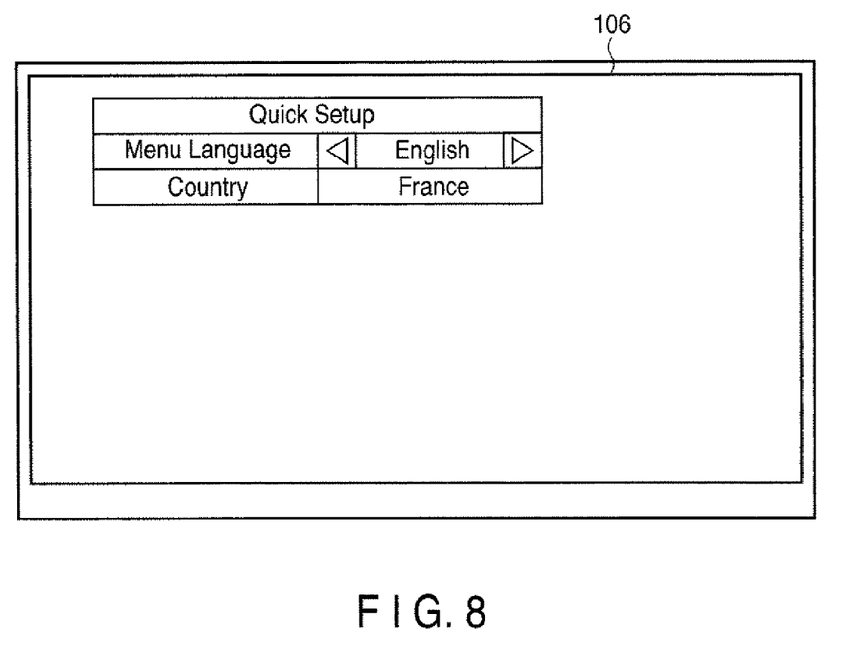
FIG. 8 is a diagram for explaining another example of a menu screen of the receiver of the present invention.

FIG. 8 illustrates an example of the menu screen. This menu screen appears when setting up the television receiver. The language used in the menu screen is set by default, for example, to English. When the power switch is operated, "menu language" and "country" appear as a quick setup menu. The user can select a language from English, French or other languages, as the user wishes. For some television receivers, the country may already be configured as a factory default setting. If this is the case, the "country" item would not be highlighted.

According to the above invention, the language for server connection is automatically determined to agree with the language of the menu that is initially set up by the user, which facilitates the operation of the receiver and improves the usability.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms of modifications as would fall within the scope and spirit of the inventions.

What is claimed is:

1. An electronic device comprising:
   a tuner to receive a digital broadcasting signal;
   a transport decoder to select a television program included in the digital broadcasting signal and output video data and audio data in packets of the television program;
   a decoder to decode the video and audio data of the television program from the transport decoder;
   an on-screen display (OSD) controller to control an output of a display menu;
   a net connection module to connect the electronic device to a server;
   an initial setup module, controlled by a controller, to set-a menu language of the display menu when the initial setup module conducts an initial setup of the electronic device according to a user operation input;
   a network control module, controlled by the controller, to access the server through the net connection module and transmit an Hypertext Transfer Protocol (HTTP) request with a header including information that identifies at least the menu language set by the initial setup module; and
   a browser function control module, controlled by the controller, to display content delivered from the server, wherein the content is displayed in a language identical to the menu language of the display menu and the language of the content selected by the server is based on the information provided by the network control module.

2. The electronic device of claim 1 further comprising:
   a remote control command process module, controlled by the controller, to generate the user operation input on the initial setup module, wherein the user operation determines the menu language when the user places a cursor being at a selected language indication among menu languages on the display menu and presses an enter button.

3. The electronic device of claim 1, wherein the information is configured to cause the server to deliver the content in the set menu language.

4. The electronic device of claim 1, wherein the information includes a language request signal.

5. A method of controlling an electronic device, the electronic device comprising a tuner for receiving a digital broadcasting signal, a transport decoder for selecting a television program included in the digital broadcasting signal and outputting video data and audio data in packets of the television program, a decoder for decoding the video and audio data of the television program from the transport decoder, an on-screen display (OSD) controller for controlling an output of a display menu, a net connection module for connecting the electronic device to a server, and an initial setup module the method characterized by comprising:
   setting a menu language of the display menu by the initial setup module when the initial setup module conducts an initial setup of the electronic device according to a user operation input;
   accessing the server through the net connection module, the accessing of the server comprises transmitting transmit an Hypertext Transfer Protocol (HTTP) request with a header including information that identifies at least the menu language which is set by the initial setup module; and
   displaying content delivered from the server, wherein the content is displayed in a language identical to the menu language of the display menu and the language of the content is selected by the server based on the information provided when accessing the server.

6. The method of controlling the electronic device of claim 5, further comprising:
   generating the user operation input as used by the initial setup module, wherein the user operation determines the menu language when the user places a cursor being at a selected language indication among menu languages on the display menu and presses an enter button.

7. The method of controlling the electronic device of claim 5, wherein the information is configured to cause the server to deliver content in the set menu language.

8. The method of controlling the electronic device of claim 5, wherein the information includes a language request signal.

9. An electronic device comprising:
a tuner configured to receive an incoming signal;
a transport decoder configured to select a television program included in the incoming signal and output video data and audio data in packets of the television program;
a decoder configured to decode the video and audio data of the television program from the transport decoder;
a controller configured to control an output of a display menu;
a net connection module configured to establish communication with a server;
an initial setup module, controlled by the controller, to set a menu language of the display menu;
a network control module, controlled by the controller, to access the server through the net connection module and transmit an Hypertext Transfer Protocol (HTTP) request with a header including information that identifies at least the menu language which is set by the initial setup module; and
a browser function control module, controlled by the controller, to display content delivered from the server, wherein the content is displayed in a language identical to the menu language of the display menu and the language of the content is selected by the server based on the information provided when accessing the server.

10. The electronic device of claim 9 further comprising:
a remote control command process module controlled by the controller, produce a user operation input on the electronic device, wherein the user operation determines the menu language when the user places a cursor being at a selected language indication among menu languages on the display menu and presses an enter button.

11. The electronic device of claim 9,
wherein the information is configured to cause the server to deliver content in the set menu language.

12. The electronic device of claim 9, wherein the information includes a language request signal.

13. An electronic device comprising:
a receiver to receive a television program including video and audio data;
a decoder to decode the video and audio data of the television program;
an on-screen display (OSD) controller to control an output of a display menu;
a network connector to communicatively couple the electronic device to a server;
an initial setup module controlled by a controller, the initial setup module to set a menu language of the display menu when the initial setup module conducts an initial setup of the electronic device according to a user operation input;
a network control module controlled by the controller, the network control module to access the server through the network controller and transmit an Hypertext Transfer Protocol (HTTP) request with a header including information that identifies at least the menu language which is set by the initial setup module; and
a browser function control module controlled by the controller, the browser function control module to display content delivered from the server, wherein the content is displayed in a language identical to the menu language of the display menu and the language of the content selected by the server is based on the information used by the network control module.

* * * * *